US010552217B2

(12) United States Patent
Baughman et al.

(10) Patent No.: US 10,552,217 B2
(45) Date of Patent: Feb. 4, 2020

(54) WORKLOAD PLACEMENT IN A HYBRID CLOUD ENVIRONMENT

(71) Applicant: International Business Machines Corporation, Armonk, NY (US)

(72) Inventors: Aaron K. Baughman, Silver Spring, MD (US); Nicholas A. McCrory, Sacramento, CA (US); Michelle Welcks, Tampa, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 596 days.

(21) Appl. No.: 15/237,589

(22) Filed: Aug. 15, 2016

(65) Prior Publication Data

US 2018/0046476 A1 Feb. 15, 2018

(51) Int. Cl.
*G06F 9/50* (2006.01)

(52) U.S. Cl.
CPC ..................... *G06F 9/50* (2013.01)

(58) Field of Classification Search
CPC ....................................................... G06F 9/50
USPC .......................................................... 703/11
See application file for complete search history.

(56) References Cited

U.S. PATENT DOCUMENTS

| 9,246,839 | B2 * | 1/2016 | Banatwala | ............... | H04L 63/20 |
| 2014/0089509 | A1 * | 3/2014 | Akolkar | ................ | H04L 41/147 |
| | | | | | 709/226 |
| 2015/0019301 | A1 * | 1/2015 | Jung | ................ | G06Q 10/06393 |
| | | | | | 705/7.39 |
| 2017/0262362 | A1 * | 9/2017 | Duttagupta | ........... | G06F 11/302 |

OTHER PUBLICATIONS

Calheiros et al; EMUSIM: An Integrated Emulation and Simulation Environment for Modeling, Evaluation, and Validation of Performance of Cloud Computing Applications, Software—Practice and Experience Softw. Pract. Exper. 2012; 00:1-18, Published online in Wiley InterScience (www.interscience.wiley.com). DOI: 10.1002/spe.

Tendem Computers Inc; A Benchmark of Non stop SQL on the Debit Credit Transaction, 1998.

(Continued)

*Primary Examiner* — Brian S Cook
(74) *Attorney, Agent, or Firm* — Garg Law Firm, PLLC; Rakesh Garg; James Nock (57) ABSTRACT

An application is deployed on a first cloud from a set of clouds. A simulator is deployed on each cloud in the set. A vertical relationship function is computed between a time-series of the application and a time-series of the simulator. A first actual value in the time-series of the application is forecasted for a future time. A horizontal relationship function is computed between a first simulator value in the time-series of the simulator on the first cloud and a second simulator value in the time-series of the simulator on a second cloud. A second actual value in the time-series of a hypothetical deployment of the application on the second cloud is forecasted for the future time without deploying the application on the second cloud. The application is placed on the second cloud when the second actual value satisfies a condition.

13 Claims, 5 Drawing Sheets

(56) References Cited

OTHER PUBLICATIONS

Balogun et al; A robust real-time online comparative monitoring of an azimuthal-altitude dual axis GST 300 and a 45 fixed solar photovoltaic energy tracking systems, Apr. 9-12, 2015.
Shao et al; CrossShade: Shading Concept Sketches Using Cross-Section Curves, 2012.
Burns et al; Experiments with a digital computes in a simple control system.
Ahn et al; Auto-Scaling method in hybrid cloud for scientific applications.
Smowton et al; Genome analysis in a dynamically scaled hybrid cloud.
Lim et al; Performance implications from sizing a VM on multi-core systems: A data analytic applications's view, 2013.
Ghasemi et al; Real time diagnosis of TCP performance in clouds, 2013.
An, Resource management and fault tolerance principles for supporting distributed realtime and embedded systems in the cloud, 2012.
Paul; Virtualization Performance Analysis: Has the Game Changed?, Apr. 7, 2015.
Shehadi et al; THEMATICS is Effective for Active Site Prediction in Comparative Model Structures, 2004.
Yin et al; Toward real time data analysis for smart grids., 2012.

\* cited by examiner

WORKLOAD PLACEMENT IN A HYBRID CLOUD ENVIRONMENT

TECHNICAL FIELD

The present invention relates generally to a method, system, and computer program product for deploying or placing a workload at a suitable node in a cloud computing environment. More particularly, the present invention relates to a method, system, and computer program product for workload placement in a hybrid cloud environment.

BACKGROUND

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud model may include any of the at least five characteristics, which are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

A cloud model may further include any of the at least three service models, which are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

A cloud model may further include any of the at least four deployment models, which are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Physical networks usually exist within the demarcated boundary of the data processing environment whose physical components are utilized in the physical network. Unlike a physical network, a software defined network (SDN) can be designed to span across one or more data processing environment. For example, while a physical network may be contained within a datacenter, an SDN may span across one or more datacenters. An SDN is a logical network of virtualized physical data processing systems and networking components (collectively, "physical computing resources"). Essentially, the physical computing resources are abstracted into corresponding logical or virtual representations, and the abstractions are used to define the SDN. In other words, an SDN is a logical network formed and operated using logical representations of the underlying physical computing resources.

A workload that is processed in a cloud can take the form of a software application or a process that is executed using the computing resources of one or more logical or physical data processing systems available in the cloud. Depending on the requirements of the workload, a suitable data processing system has to be selected such that the data processing system at least meets those requirements.

Because the cloud can be geographically spread across a region of any size—e.g., across a city, state, country, or the globe—the data processing systems that are usable for processing the workload in different portions of a single cloud configured according to a single deployment model—e.g. in different geographical regions, different clouds configured according to different deployment models, or some combination thereof. The process of selecting a suitable data processing system within different portions options of a cloud (intra-cloud), or from different cloud options (inter-cloud) for meeting a given workload's requirements is known as resolving' the workload, a 'resolution' of a workload, a placement' of a workload, or 'placing' a workload.

SUMMARY

The illustrative embodiments provide a method, system, and computer program product. An embodiment includes a method that deploys an application on a first cloud from a set of clouds in a hybrid cloud environment. The embodiment deploys an instance of a simulator on each cloud in the set of clouds. The embodiment computes, using a processor and a memory, a vertical relationship function between a time-series of the application on the first cloud and a time-series of the instance of the simulator on the first cloud. The embodiment forecasts, for a future time, using the processor and the memory, a first actual value in the time-series of the application on the first cloud. The embodiment computes a horizontal relationship function between a first simulator value in the time-series of the instance of the simulator on the first cloud and a second simulator value in the time-series of the instance of the simulator on a second cloud. The embodiment forecasts, for the future time, using the processor and the memory, a second actual value in the time-series of a hypothetical deployment of the application on the second cloud without actually deploying the application on the second cloud. The embodiment places the application on the second cloud responsive to the second actual value satisfying a selection condition.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that many workload placement techniques presently exist, which attempt to place or resolve a given workload to a suitable data processing system while satisfying one or more objectives of a data processing environment. For example, workload placement in a cluster attempts to satisfy an objective to maximize a utilization parameter of a resource, minimize a latency parameter of the workload, maximize the up-time parameter of an application, minimize the operating cost of a tenant of the data processing environment, and many others.

The illustrative embodiments recognize that a hybrid cloud is a complex combination of clouds. As a simple example, combining one private, one public, and one soft layer cloud environments can result in nine possible options for the placement of an application. The performance of the application will have to be measured in a large subset of the available options, if not in all options, to determine which cloud option is the most suitable for placing the workload to meet certain objectives.

If ten different cloud computing environments were available as deployment options, in theory there would be 3.24*10^16 different combinations of environments to measure, to determine where to deploy an application. In practice, there would be 1022 possible combinations—which is still a very large number of deployment options—in which to measure the performance of the application.

Thus, the illustrative embodiments recognize that the number of cloud options that are practically available for deploying an application can be very large. Presently, accordingly to one deployment technique, an application has to be deployed in a cloud environment, at least temporarily, to measure the performance of the application in that cloud environment. The illustrative embodiments recognize that deploying a complex application across the combinatorial explosion of hybrid cloud resources is not practical nor feasible.

Presently, according to another deployment technique, historical performance data from previous deployment of the application in various cloud environments may be analyzed to select a suitable cloud environment for the present deployment. The illustrative embodiments recognize that in many cases, historical performance data may be unavailable or unusable for a variety of reasons.

The illustrative embodiments further recognize that once a cloud environment is selected and the application is deployed, the application might have to be moved to a different cloud environment at some point in time for a variety of reasons. For moving the application from one cloud environment to another, a process similar to the initial deployment has to be performed to select another suitable cloud environment according to the changed needs or objectives, and that process suffers from the same drawbacks as described above.

The illustrative embodiments used to describe the invention generally address and solve the above-described problems and other problems related to workload placement in a hybrid cloud environment.

An embodiment can be implemented as a software application. The application implementing an embodiment can be configured as a modification of an existing workload placement system, as a separate application that operates in conjunction with an existing workload placement system, a standalone application, or some combination thereof.

Hereinafter, an 'actual' application is an application or a workload that has to be placed in a suitable cloud environment. An actual application is also interchangeably referred to herein as an 'actual'. The terms 'cloud environment', 'cloud', and 'option' are interchangeably used to refer to a cloud environment or a portion thereof that may be a choice of cloud environments available and usable for the placement of the actual application.

A 'simulation' application is an application that is not necessarily a simulation of the actual application but is another application that consumes computing resources and interacts with the cloud environment in a manner substantially similar to the actual application. A simulation application is also interchangeably referred to herein as a 'simulation' or a 'sim'. A sim is significantly less complex and relatively light weight as compared to the corresponding actual. Deploying a sim instance in a cloud environment option is significantly less complex or expensive as compared to deploying the actual in the same option.

An embodiment deploys the actual and an instance of the sim in one option, e.g., cloud environment $E_1$. The embodiment deploys separate sim instances in each option that is being considered for the deployment of the actual, e.g., cloud environments $E_2$-$E_n$. Note that each of $E_1$-$E_n$ can be a portion of a cloud environment configured in a suitable manner, or a separate cloud environment according to same or different configuration models as described herein.

As the actual operates in the deployed option $E_1$, the actual's performance produces a time-series, such as a time-series of performance data of the actual ($T_{A1}$). The embodiment computes a function ($F_{TA1}$) that fits the time-series of the actual. Function $F_{TA1}$ is usable to forecast a performance value that is likely to be observed at a future time during the execution of actual in $E_1$.

Similarly, as the sim instance operates in the deployed option $E_1$, the sim's performance produces a time-series, such as a time-series of performance data of the sim instance ($T_{S1}$). The embodiment computes a function ($F_{TS1}$) that fits the time-series of the sim. Function $F_{TS1}$ is usable to forecast a performance value that is likely to be observed at a future time during the execution of the sim in $E_1$.

An embodiment computes a vertical relationship function ($F_B$). Function $F_B$ fits the curve of the relationship between time-series $T_A1$ and $T_{S1}$. In other words, FB describes how $T_{S1}$ would change when $T_{A1}$ changes, and vice versa. Given FB and a forecasted performance value in $T_{A1}$ at a future time, a value in $T_{S2}$ can be forecasted for the same future time.

Each sim instance operating in a corresponding option produces a time-series in a similar manner as $T_{S1}$. For example, sim instance in $E_2$ produces $T_{S2}$, ..., and sim instance in $E_n$ produces $T_{Sn}$. An embodiment computes a horizontal relationship function ($F_A$). Function $F_A$ fits the curve of relationship between the time-series of two sim instances operating in two different options, one of them being the sim instance operating in option $E_1$. For example, function $F_{A12}$ fits the curve of the relationship between time-series $T_{S1}$ and $T_{S2}$, function $F_{A1n}$ fits the curve of the relationship between time-series $T_{S1}$ and $T_{Sn}$, and so on. As an example, $F_{A1n}$ describes how $T_{Sn}$ would change when $T_{S1}$ changes. Given $F_{A1n}$ and a forecasted performance value in $T_{S1}$ at a future time, a value in $T_{Sn}$ can be forecasted for the same future time.

An embodiment computes a titration function ($F_C$). Titration function $F_C$ is an option-specific function, e.g., $F_{C1n}$ is for option $E_n$, which combines the $F_{A1n}$ and $F_B$ functions to forecast a value $V_n$ in time-series $T_{An}$. Time-series $T_{An}$ is a time-series of performance values expected to be observed if the actual were hypothetically placed in option $E_n$. $V_n$ is a forecasted value in $T_{An}$ at the same future time for which $T_{A1}$ value has been forecasted, but is expected to be observed if the actual were hypothetically placed in option $E_n$. In other words, even though the actual in operating on $E_1$ and not on $E_n$, if the actual were operating on $E_n$, the actual's operation on $E_n$ would be expected to produce performance value $V_n$ in time-series $T_{An}$ at the future time.

In one example embodiment, $F_{C1n}$ is an addition of functions $F_B$ and $F_{A1n}$. I.e., $F_{C1n}=(F_B+F_{A1n})$. In this example, $V_n$ would be (an output of $F_B$, which is a forecasted performance value in $T_{A1}$ at a future time+an output of $F_{A1n}$, which is a value in $T_{Sn}$ forecasted for the same future time).

In this manner, an embodiment computes $V_1, V_2, \ldots, V_n$ for each option where the actual can be placed without actually placing the actual in any of the options except one. Each of values $V_1 \ldots V_n$, is a forecasted performance value if the actual were placed on the corresponding option. An embodiment causes an application placement system to select a forecasted performance value for a particular option, e.g., $V_x$ for option $E_x$ according to some selection condition. In one embodiment, the selection condition selects $V_x$ where $V_x$ is the lowest or smallest value in $V_1 \ldots V_n$. This example of selection condition is not intended to be limiting. From this disclosure, those of ordinary skill in the art will be able to conceive many other selection conditions to satisfy one or more of numerous possible objectives in workload placement, and the same are contemplated within the scope of the illustrative embodiments.

An embodiment places the actual on the selected option, or causes the application placement system to place the actual on the selected option - such as by sending an instruction to the application placement system. An embodiment can also generate a report of recommended placement option to enable an administrator to perform the placement of the actual on the selected option.

Once the actual has been placed on a selected option, e.g., on option $E_x$, the actual performance of the actual can be monitored. In other words, an embodiment collects the time-series of the actual performance data from the operation of the actual on $E_x$. If or when a need arises to change the placement of the actual, $E_x$ is regarded as the one option where the actual is placed from the possible set of options where the actual can be placed. The process described herein is then repeated relative to the actual operating at $E_x$ to select a new option for placing or moving the actual.

A method of an embodiment described herein, when implemented to execute on a device or data processing system, comprises substantial advancement of the functionality of that device or data processing system in application placement in a hybrid cloud data processing environment. For example, some presently available methods for application placement rely on the historical performance data of the application on various placement options to select a suitable option, but such historical data may not be available or usable. Some other presently available methods for application placement rely on actually placing the application on various placement options, performing performance measurements at those various options, and then selecting a suitable option from the measurements. Such methods are extremely expensive and highly impractical when several cloud environments participate in a hybrid cloud. An embodiment deploys a lightweight sim in the options with only one instance of the actual application deployed in one option. The embodiment computes relationships between various time-series produced by the actual and the sims to forecast a performance of the actual on any of the options without placing the actual on that option. The option with the desirable forecasted performance value is then selected. This manner of workload placement in a hybrid cloud environment is unavailable in the presently available methods. Thus, a substantial advancement of such devices or data processing systems by executing a method of an embodiment is in significantly reducing the computing cost of selecting a suitable placement for an actual application, and in enabling optimized rapid application placement in large hybrid cloud computing environments.

The illustrative embodiments are described with respect to certain types of data processing environment, workloads, objectives, time-series, values, options, functions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
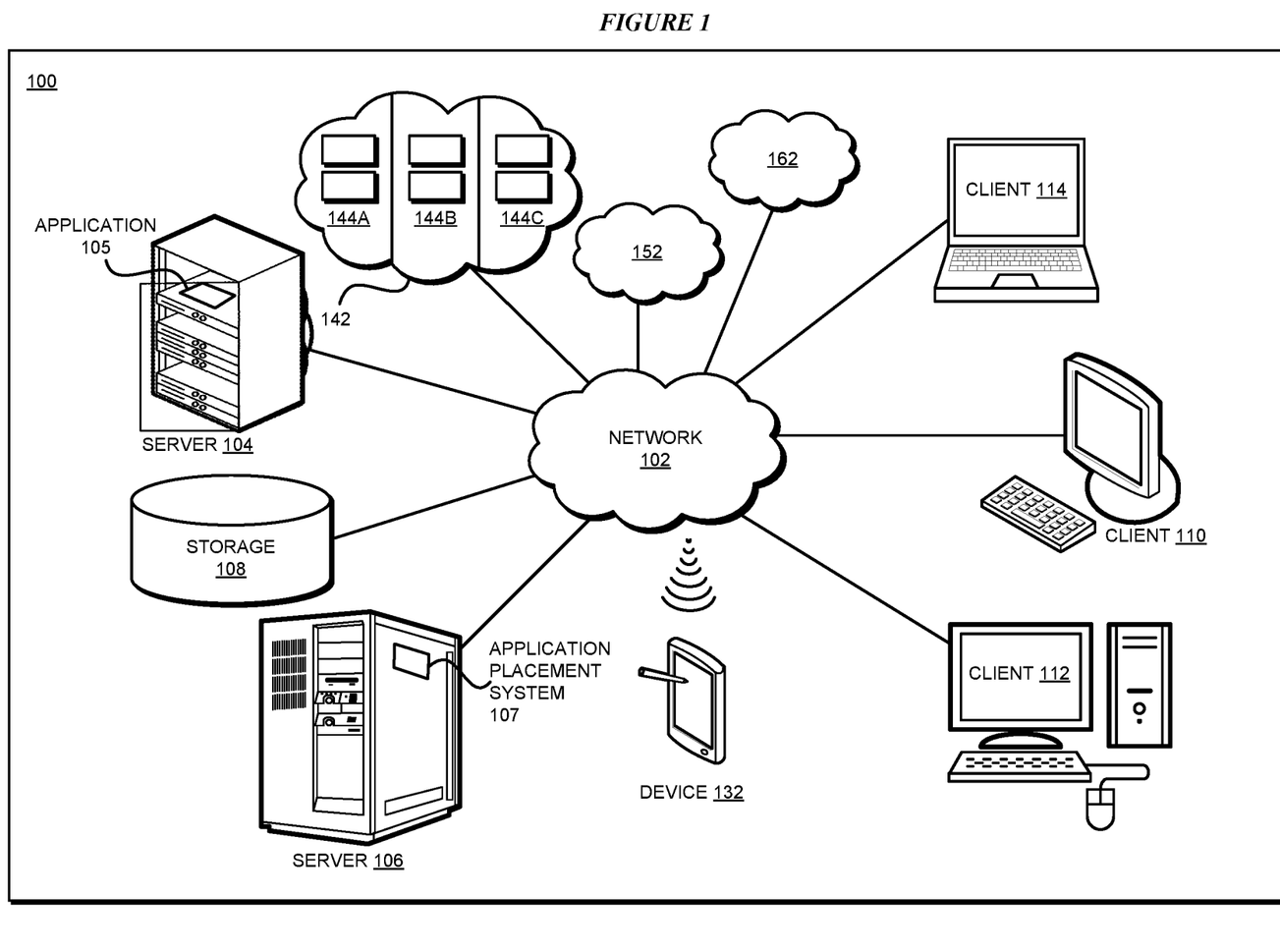
FIG. 1 depicts a block diagram of a network of data processing systems in which illustrative embodiments may be implemented.
Figure 2:
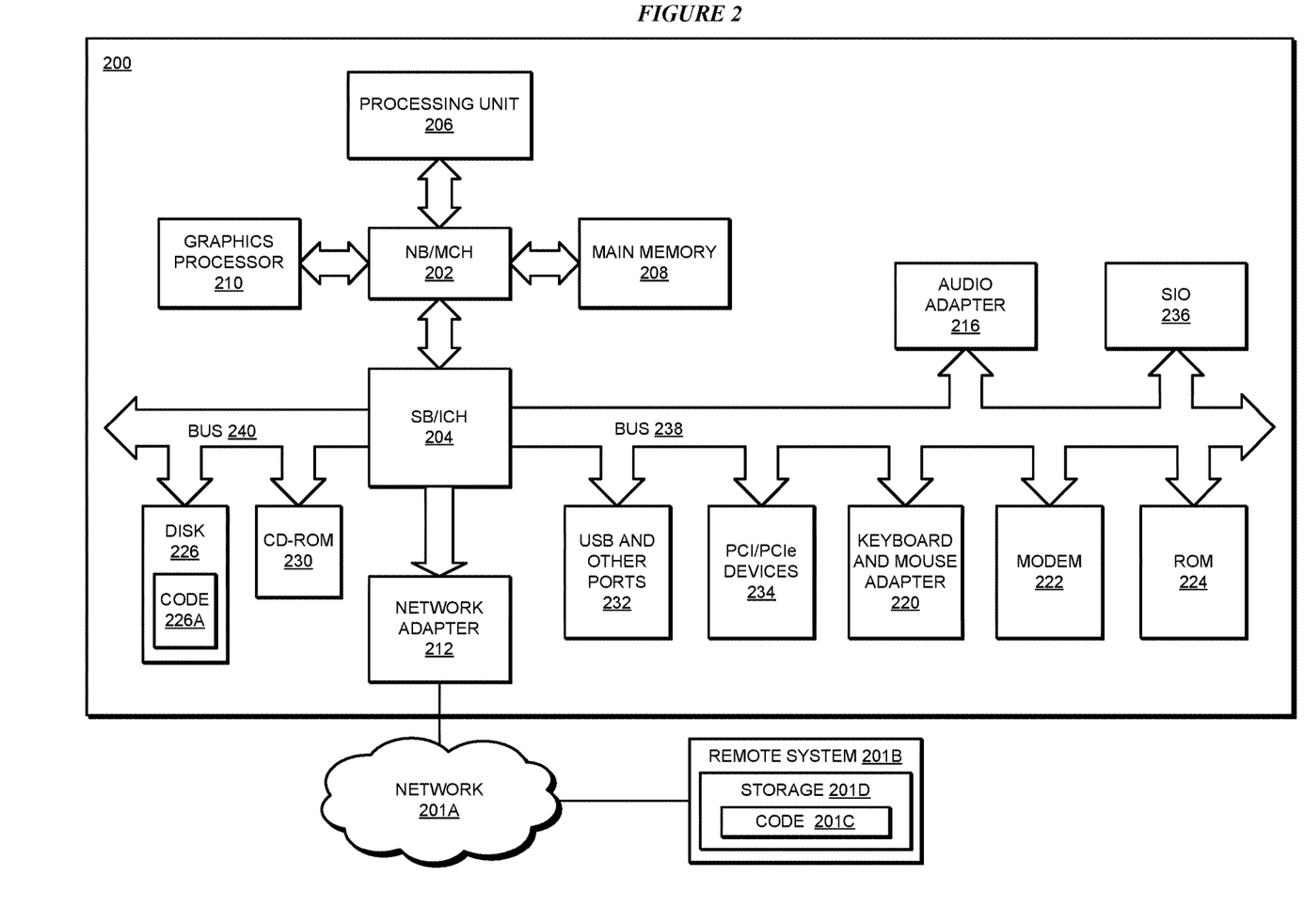
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Cloud 142 is an example of an option described herein and comprises any number of example portions 144A, 144B, and so on until portion 144C. Clouds 152 and 162 are each an example of any number of other clouds that are configured according to a configuration model same as or different from cloud 142 and each other. Clouds 142, 152, . . . , 162 collectively form a hybrid cloud as described herein. Application placement system 107 manages the placement of actual applications in hybrid cloud 142-162 in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
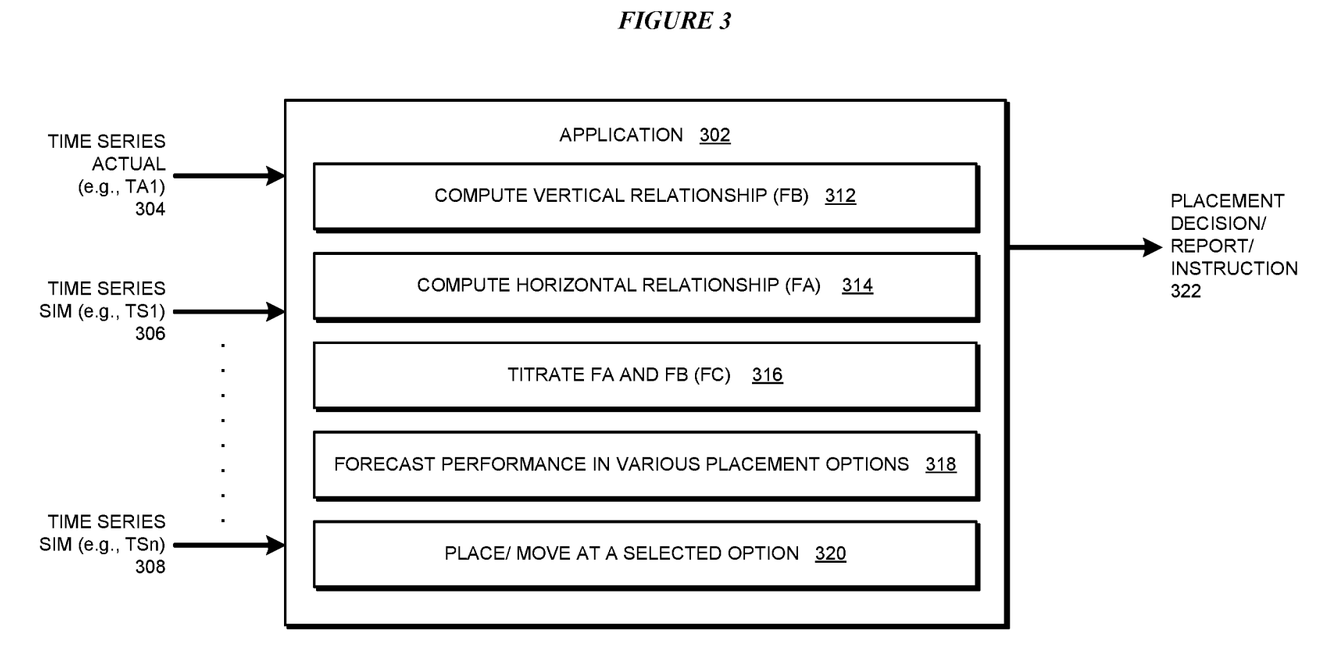
FIG. 3 depicts a block diagram of an example configuration for workload placement in a hybrid cloud environment in accordance with an illustrative embodiment.

With reference to FIG. 3, this figure depicts a block diagram of an example configuration for workload placement in a hybrid cloud environment in accordance with an illustrative embodiment. Application 302 is an example of application 105 in FIG. 1.

Again, suppose that options $E_1, \ldots E_n$ are available for an actual application. Application 302 causes the actual to be placed on one of the options, e.g., on $E_1$. Application 302 causes instances of a sim to be placed on each of the options, e.g., on $E_1, \ldots E_n$. For example, component 320 of application 302 could be configured to perform the initial placements in this manner.

The actual on $E_1$ produces time-series $T_{A1}$, which forms input 304. The sims on $E_1 \ldots E_n$ each produces time-series $T_{S1} \ldots T_{Sn}$, respectively, which form inputs 306 ... 308, respectively.

Component 312 computes a vertical relationship function $F_B$ between $T_{A1}$ and $T_{S1}$ in a manner described herein. Component 314 computes a horizontal relationship functions $F_{A12} \ldots F_{A1n}$ between $T_{S1}$ and each of $T_{S2} \ldots T_{Sn}$ respectively, in a manner described herein.

Component 316 titrates, or computes, function $F_{C12} \ldots F_{C1n}$ using ($F_B$ and $F_{A12}$), ..., ($F_B$ and $F_{C1n}$), respectively, as described herein. Using $F_{C12} \ldots F_{C1n}$, component 318 forecasts $V_2 \ldots V_n$ for hypothetical placements of the actual at options $E_2 \ldots E_n$, respectively, as described herein.

Component 320 selects a placement option, e.g., $E_x$, based on the corresponding $V_x$ value satisfying a selection condition. Component 320 causes output 322. As described herein, output 322 may be the placement operation to place the actual on $E_x$, may be an instruction to application placement system 107 in FIG. 1 to perform the placement, or a recommended placement report to an administrator, as may suit a particular implementation.

Post-placement, application 302 can be configured to receive input 304 from $E_x$ thereafter, e.g., in the form of $T_{Ax}$, input 306 from $T_{Sx}$, and so on. Based on the new inputs 304-308, and when needed, application can facilitate placement, re-placement, or move of the actual to another suitable option, e.g., to $E_y$.

Figure 4:
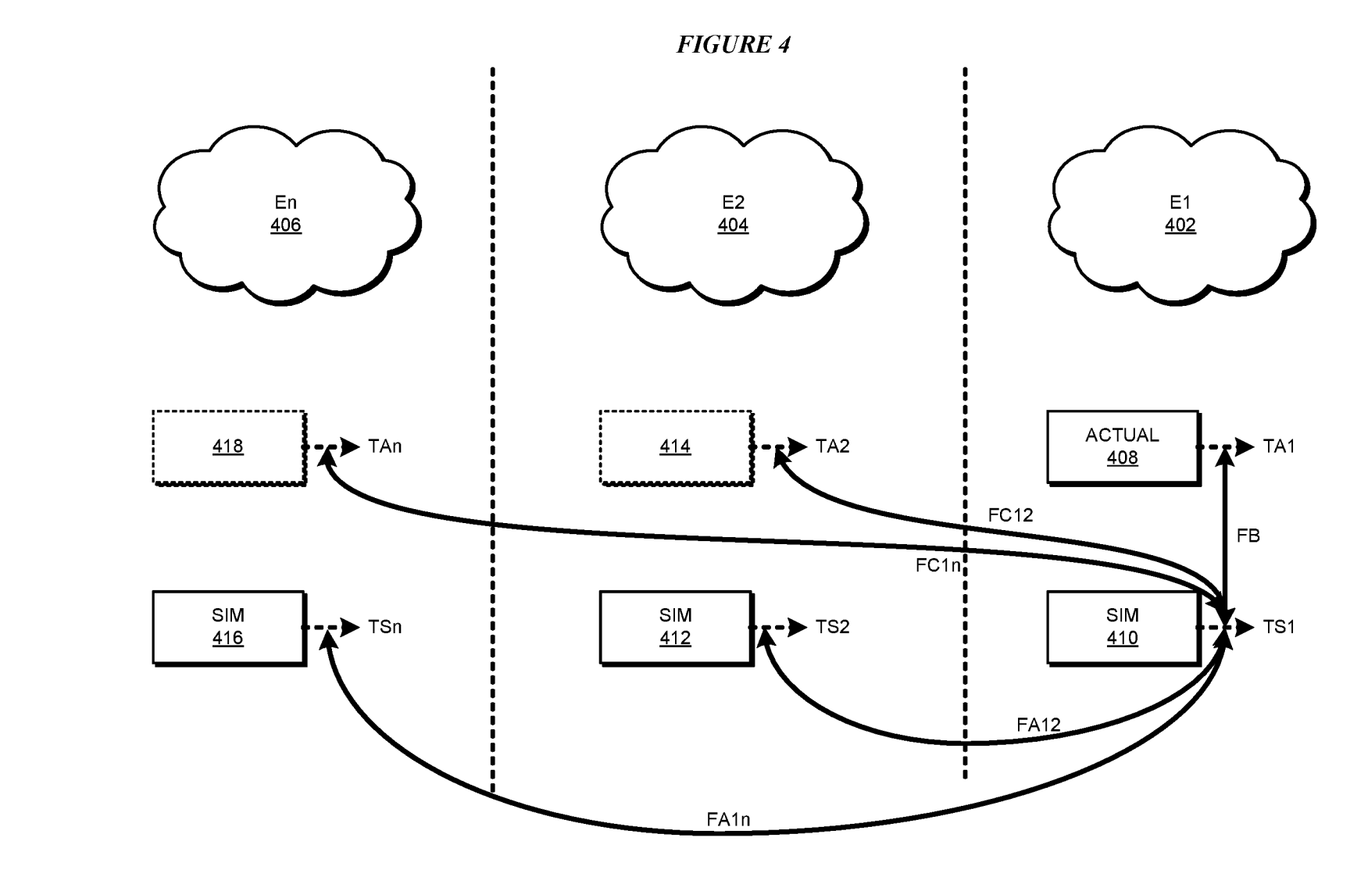
FIG. 4 depicts a block diagram of an example operation for workload placement in a hybrid cloud environment in accordance with an illustrative embodiment.

With reference to FIG. 4, this figure depicts a block diagram of an example operation for workload placement in a hybrid cloud environment in accordance with an illustrative embodiment. Option $E_1$ (402), option $E_2$ (404), ..., option $E_n$ (406) can each be an example of portions 144A, 144B, or 144C in FIG. 1, an example of cloud 142, 152, or 162 in FIG. 1, or some combination thereof. Actual application 408 is placed at $E_1$ and produces time-series $T_{A1}$. Sim 410 is placed on $E_1$ and produces time-series $T_{S1}$.

Sim 412 is placed on $E_2$ and produces time-series $T_{S2}$. Placement 414 is a hypothetical placement of actual 408 on $E_2$—i.e., without really placing actual application 408 or an instance thereof on $E_2$. $T_{A2}$ is the time-series that would be expected from such a hypothetical placement, if actual 408 or an instance thereof were really placed on E2.

Similarly, sim 416 is placed on $E_n$ and produces time-series $T_{Sn}$. Placement 418 is a hypothetical placement of actual 408 on $E_n$—i.e., without really placing actual application 408 or an instance thereof on $E_n$. $T_{An}$ is the time-series that would be expected from such a hypothetical placement, if actual 408 or an instance thereof were really placed on $E_n$.

$F_B$ is the vertical relationship function between $T_{A1}$ and $T_{S1}$ as described herein. $F_{A12}$ is a horizontal relationship function between $T_{S1}$ and $T_{S2}$; and $F_{A1n}$ is a horizontal relationship function between $T_{S1}$ and $T_{Sn}$.

$F_{C12}$ is a function of $F_B$ and $F_{A12}$, and forecasts a value $V_2$ in $T_{A2}$. $F_{C1n}$ is a function of $F_B$ and $F_{A1n}$, and forecasts a value $V_n$ in $T_{An}$.

Figure 5:
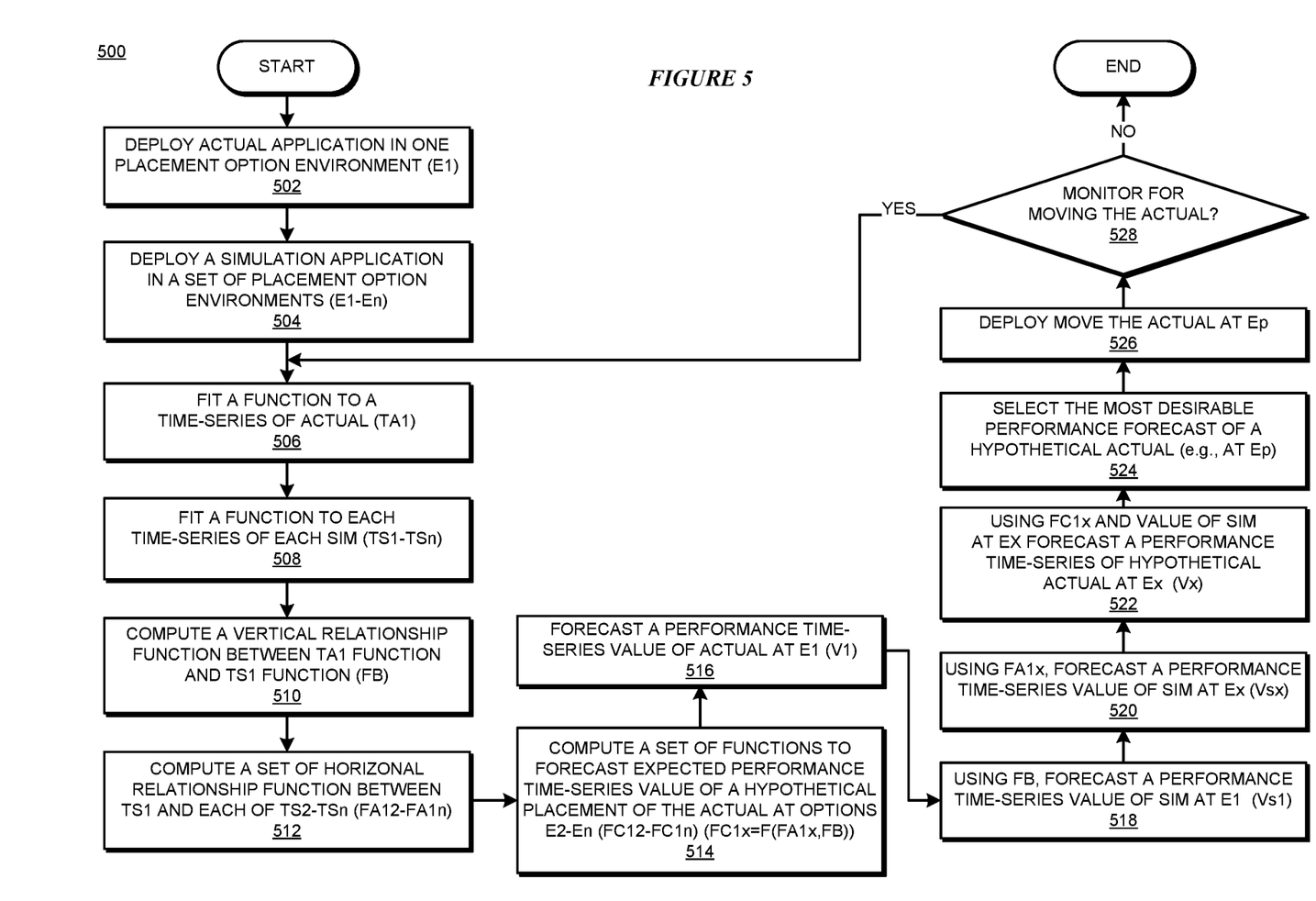
FIG. 5 depicts a flowchart of an example process for workload placement in a hybrid cloud environment in accordance with an illustrative embodiment.

With reference to FIG. 5, this figure depicts a flowchart of an example process for workload placement in a hybrid cloud environment in accordance with an illustrative embodiment. Process 500 can be implemented in application 302 in FIG. 3.

The application deploys an actual application in one environment from a set of placement option cloud environments, e.g., in $E_1$ (block 502). The application deploys an instance of a simulation application in each of the option environments, e.g., in $E_1 \ldots E_n$ (block 504). The application fits a function to time-series $T_{A1}$ of the actual (block 506). The application fits a function to each time-series of each sim, i.e., $T_{S1} \ldots T_{Sn}$ (block 508).

The application computes a vertical relationship function $F_B$ between $T_{A1}$ and $T_{S1}$ (block 510). The application computes a set of horizontal relationship functions $F_{A12} \ldots F_{A1n}$ corresponding to time-series pairs $T_{S1}$ and $T_{S1}$ and $T_{Sn}$ (block 512).

The application computes a set of functions FC to forecast expected time-series of each hypothetical placement of the actual at options $E_2 \ldots E_n$ (block 514). For example, $F_{C1x} = F(F_{A1x}, F_B)$.

The application forecasts value $V_1$ in $T_{A1}$ at a future time T (block 516). The application uses $F_B$ to forecast value $V_{S1}$ in $T_{S1}$ at future time T (block 518).

Using $F_{A1x}$, the application forecasts values $V_{Sx}$, in time-series $T_{Sx}$ at option $E_x$ (block 520). Using $F_{C1x}$, the application forecasts values $V_x$ in time-series $T_{Ax}$ at option $E_x$ (block 522). The application repeats blocks 520-522 for each value of x from 2 . . . n.

The application selects the most suitable forecasted value from $V_1 \ldots V_n$, e.g. $V_p$ for hypothetical placement of the actual at option Ep, by using a selection condition (block 524). The application deploys, places, or moves the actual application on $E_p$, or causes the deployment, placement, or movement to occur as described herein (block 526).

The application determines whether to monitor the deployed actual application's performance at $E_p$ for the circumstance that the actual may have to be moved to a different option (block 528). If the performance has to be monitored ("Yes" path of block 528), the application returns process 500 to block 506. If the performance does not have to be monitored ("No" path of block 528), the application ends process 500 thereafter.

Thus, a computer implemented method, system or apparatus, and computer program product are provided in the illustrative embodiments for workload placement in a hybrid cloud environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
deploying an application on a first cloud from a set of clouds in a hybrid cloud environment;
deploying an instance of a simulation on each cloud in the set of clouds;
computing, using a processor and a memory, a vertical relationship function between a time-series of the application on the first cloud and a time-series of the instance of the simulation on the first cloud, the time-series of the application comprising performance data of the application and the time-series of the instance of the simulation comprising performance data of the instance of the simulation;
computing a first function to fit the time-series of the application on the first cloud;
forecasting, for a future time using the first function, using the processor and the memory, a first performance data value in the time-series of the application on the first cloud;
computing a second function to fit the time-series of the instance of the simulation on the first cloud;
computing a third function to fit the time-series of the instance of the simulation on the second cloud;
forecasting, for the future time, the second performance data value in the time-series of the instance of the simulation on the first cloud using the vertical relationship function and the first performance data value;
computing a horizontal relationship function between a second performance data value in the time-series of the instance of the simulation on the first cloud and a third performance data value in the time-series of the instance of the simulation on a second cloud;
forecasting, for the future time, using the processor and the memory, a fourth performance data value in the time-series of a hypothetical deployment of the application on the second cloud without actually deploying the application on the second cloud, wherein the fourth performance data value is output by a prediction function corresponding to the second cloud, the prediction function computed using the vertical relationship function and the horizontal relationship function; and
placing the application on the second cloud responsive to the fourth performance data value satisfying a selection condition.

2. The method of claim 1, further comprising:
forecasting the third performance data value in the time-series of the instance of the simulation on the second cloud using the second function.

3. The method of claim 1, further comprising:
configuring the simulation such that a computing cost of deploying the simulation in any cloud is less than a computing cost of deploying the application in the any cloud; and
further configuring the simulation to perform an interaction with the any cloud substantially similarly as an interaction of the application with the any cloud but without performing a function of the application.

4. The method of claim 1, wherein the first cloud is configured according to a cloud configuration model, and a second cloud in the set of clouds is configured according to a second cloud configuration model.

5. The method of claim 1, wherein the first cloud and a second cloud in the set of clouds are each a portion of a third cloud in the set of clouds, and wherein the first cloud and the second cloud are each configured according to a common cloud configuration model.

6. A computer usable program product comprising one or more computer-readable storage medium, and program instructions stored on at least one of the one or more storage medium, the stored program instructions comprising:
program instructions to deploy an application on a first cloud from a set of clouds in a hybrid cloud environment;
program instructions to deploy an instance of a simulation on each cloud in the set of clouds;
program instructions to compute, using a processor and a memory, a vertical relationship function between a time-series of the application on the first cloud and a time-series of the instance of the simulation on the first cloud, the time-series of the application comprising performance data of the application and the time-series of the instance of the simulation comprising performance data of the instance of the simulation;
program instructions to compute a first function to fit the time-series of the application on the first cloud;
program instructions to forecast, for a future time using the first function, using the processor and the memory, a first performance data value in the time-series of the application on the first cloud;
program instructions to compute a second function to fit the time-series of the instance of the simulation on the first cloud;
program instructions to compute a third function to fit the time-series of the instance of the simulation on the second cloud;
program instructions to forecast, for the future time, the second performance data value in the time-series of the instance of the simulation on the first cloud using the vertical relationship function and the first performance data value;
program instructions to compute a horizontal relationship function between a second performance data value in the time-series of the instance of the simulation on the first cloud and a third performance data value in the time-series of the instance of the simulation on a second cloud;
program instructions to forecast, for the future time, using the processor and the memory, a fourth performance data value in the time-series of a hypothetical deployment of the application on the second cloud without actually deploying the application on the second cloud, wherein the fourth performance data value is output by a prediction function corresponding to the second cloud, the prediction function computed using the vertical relationship function and the horizontal relationship function; and
program instructions to place the application on the second cloud responsive to the fourth performance data value satisfying a selection condition.

7. The computer usable program product of claim 6, further comprising:
program instructions to forecast the third performance data value in the time-series of the instance of the simulation on the second cloud using the second function.

8. The computer usable program product of claim 6, further comprising:
program instructions to configure the simulation such that a computing cost of deploying the simulation in any cloud is less than a computing cost of deploying the application in the any cloud; and
program instructions to further configure the simulation to perform an interaction with the any cloud substantially similarly as an interaction of the application with the any cloud but without performing a function of the application.

9. The computer usable program product of claim 6, wherein the first cloud is configured according to a cloud configuration model, and a second cloud in the set of clouds is configured according to a second cloud configuration model.

10. The computer usable program product of claim 6, wherein the first cloud and a second cloud in the set of clouds are each a portion of a third cloud in the set of clouds, and wherein the first cloud and the second cloud are each configured according to a common cloud configuration model.

11. The computer usable program product of claim 6, wherein the computer usable code is stored in a computer readable storage device in a data processing system, and wherein the computer usable code is transferred over a network from a remote data processing system.

12. The computer usable program product of claim 6, wherein the computer usable code is stored in a computer readable storage device in a server data processing system, and wherein the computer usable code is downloaded over a network to a remote data processing system for use in a computer readable storage device associated with the remote data processing system.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to deploy an application on a first cloud from a set of clouds in a hybrid cloud environment;
program instructions to deploy an instance of a simulation on each cloud in the set of clouds;
program instructions to compute, using a processor and a memory, a vertical relationship function between a time-series of the application on the first cloud and a time-series of the instance of the simulation on the first cloud, the time-series of the application comprising performance data of the application and the time-series of the instance of the simulation comprising performance data of the instance of the simulation;
program instructions to compute a first function to fit the time-series of the application on the first cloud;
program instructions to forecast, for a future time using the first function, using the processor and the memory, a first performance data value in the time-series of the application on the first cloud;
program instructions to compute a second function to fit the time-series of the instance of the simulation on the first cloud;
program instructions to compute a third function to fit the time-series of the instance of the simulation on the second cloud;
program instructions to forecast, for the future time, the second performance data value in the time-series of the instance of the simulation on the first cloud using the vertical relationship function and the first performance data value;
program instructions to compute a horizontal relationship function between a second performance data value in the time-series of the instance of the simulation on the first cloud and a third performance data value in the time-series of the instance of the simulation on a second cloud;
program instructions to forecast, for the future time, using the processor and the memory, a fourth performance data value in the time-series of a hypothetical deployment of the application on the second cloud without actually deploying the application on the second cloud, wherein the fourth performance data value is output by a prediction function corresponding to the second cloud, the prediction function computed using the vertical relationship function and the horizontal relationship function; and program instructions to place the application on the second cloud responsive to the fourth performance data value satisfying a selection condition.

\* \* \* \* \*